J. H. Clark,
Wringer,
№ 28,156. Patented May 8, 1860.
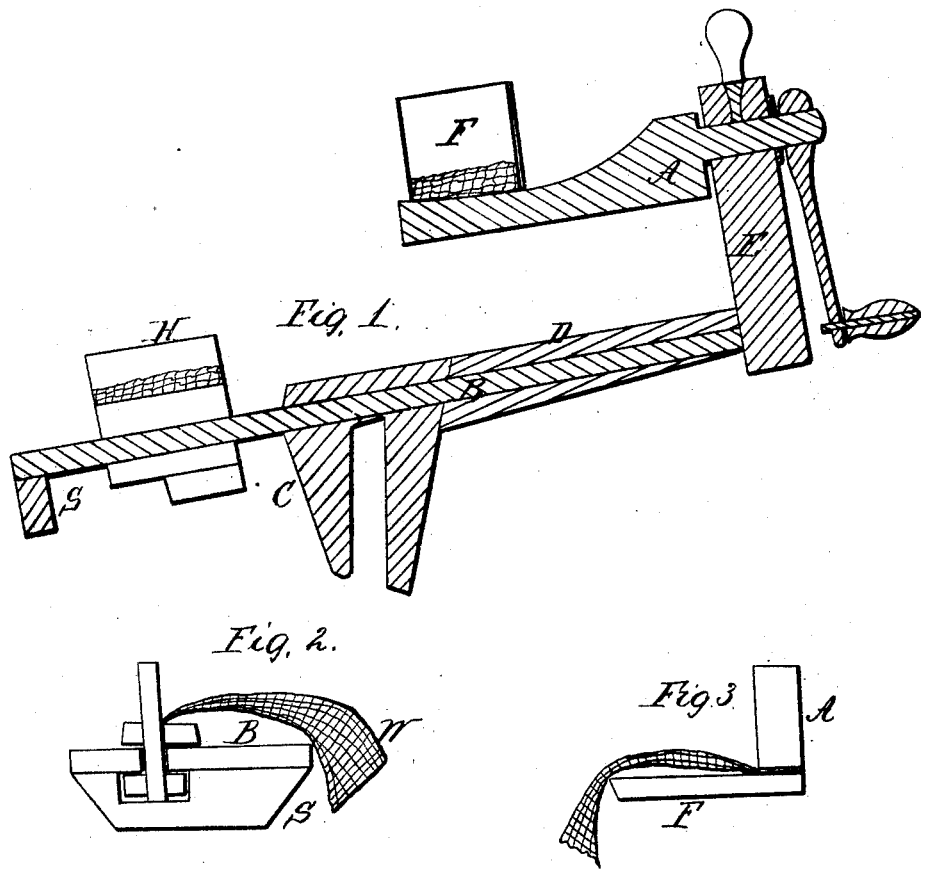
Witnesses;
Francis M. Cartley.
Edward S. Griffin
Inventor;
Joseph H. Clark

UNITED STATES PATENT OFFICE.

JOSEPH H. CLARK, OF WESTBROOK, MAINE.

WRINGING CLOTHES.

Specification of Letters Patent No. 28,156, dated May 8, 1860.

*To all whom it may concern:*

Be it known that I, JOSEPH H. CLARK, of Westbrook, in the county of Cumberland, in the State of Maine, have invented a new and Improved Clothes-Wringing Machine for Wringing Clothes which I call "Clark Clothes-Wringing Machine"; and I do hereby declare that the following is a full and exact description, reference being had to the accompanying drawings, making a part of this specification, in which—

Figure 1 is a longitudinal vertical section through the center of the board B, and post E. Fig. 2 is an end view of the adjustable holder. Fig. 3 is an end view of the twisting holder A, at its junction with the pieces F, and W'.

Similar letters of reference indicate corresponding parts in the three figures.

To enable those skilled in the art to fully understand and construct my invention, I will proceed to describe it.

I make my machine of wood webbing and iron. It may be made of any suitable material. I take the board B, made two feet long, seven inches wide and about one-inch thick, and in the center of one end I frame the post E. Upon each edge near the center of the board B, I place a piece of wood C, about six inches wide, seven inches long and one inch thick, having about one inch projection above the board B, and at an angle of about seventy-five degrees with the board B. In the lower end of the pieces C, C, I cut out a space to the bottom of the board B, the said space made about one inch wide to be used for holding the machine upon the tub. The said pieces C, C, may be fastened upon the board B, so as to bring the machine nearly perpendicular if thought best. In one or both of the pieces C, C, a small screw may be placed to make fast the hold upon the tub.

I place an edging D, on the board B, to run from the pieces C, C, around near the post E, the said edging D, to guide the waste water into the tub and made about three inches wide at the pieces C, C, to make the work firm. I make the post E, two inches square and nine inches long, and about five inches from the board B, I make a hole for the box for the journal of the piece A. The said box for the journal I make about one and three eighths inches in diameter. The said box for the journal may be made of any suitable metal having a bearing for the crank endwise of the journal. I take a piece of hard wood A that will square two inches and twelve inches long and upon one end I turn a journal three inches long, one and one fourth inches in diameter, to run in the box in the post E, and from near the journal, I cut the piece A, one half away to make a place for holding the clothes, leaving sufficient strength for twisting, and upon one edge of the piece A, I place a piece of wood F, and upon the piece F, I place a piece of webbing W', made fast at the end where I secure the piece F, to the piece A, making the webbing W', fast at the junction of the pieces F, and A. The webbing W', must be about four inches wide, ten or twelve inches long and of very fine texture. Very strong cloth may be used. In the end of the board B, over the tub, I cut out a space one inch wide and about eight inches long to receive the adjustable holder H. I take a piece of wood H, about seven inches long four inches wide and one inch thick, and upon the sides of the piece H, I place four pieces for guides to form grooves to run in the place in the end of the board B. I place a piece of webbing W, upon one of the guides of the adjustable holder H, above the board B, with firm fastenings, making the webbing W, fast at the junction of the piece H, and the piece for a guide. Upon the underside of the board B, on the end over the tub I place a piece of wood S, for a stay to the board B, and a check to the adjustable holder H, and to prevent it from being lost. The adjustable holder H, may be placed in grooves made above the board B, if thought best. I place the journal of the piece A, in the box in the post E, and place a crank on the end of the journal with firm fastenings.

The webbing W, must be the same as the webbing W'. In the top of the post E I place a piece of wood for a handle to steady the machine when in use. The fastenings should be of good materials where strength is required and covered with paint or shellac where they may be exposed to the clothes to prevent the rust.

To operate this machine I set it upon the tub as described and fold the clothes to wring and wrap the webbing W', around one end of the clothes and turn at the crank until the friction of the webbing takes hold of the clothes and then place the other end of the clothes in the adjustable holder H, by wrapping the webbing W, around them and turn at the crank until the water is fully expressed.

This machine, or the different parts of it, may be made larger or smaller than the dimensions herein given.

It will be readily seen that the twisting of clothes contracts the length and this machine accommodates the twist without any unnecessary strain to the different parts of the clothes by the adjustable holder H.

I do not claim the twisting of clothes to be wrung, by machinery; neither do I claim any arrangement patented by John McLaughlin and others; but—

What I do claim as new, and desire to secure by Letters Patent is:

The employment and use of the adjustable slide H, with its friction holder W, in combination with the twisting friction holder W′, in its combination with A, and F, substantially as and for the purpose herein set forth.

JOSEPH H. CLARK.

Witnesses:
D. C. Morton,
Eben O. Morton,
M. E. Merrill.